United States Patent
Shultz et al.

(10) Patent No.: US 8,335,620 B2
(45) Date of Patent: Dec. 18, 2012

(54) GEAR CLASH LOGIC

(75) Inventors: Jeffrey E. Shultz, Zionsville, IN (US); Scott E. Mundy, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/417,963

(22) Filed: Mar. 12, 2012

(65) Prior Publication Data

US 2012/0160045 A1    Jun. 28, 2012

Related U.S. Application Data

(62) Division of application No. 12/332,884, filed on Dec. 11, 2008, now Pat. No. 8,135,520.

(60) Provisional application No. 61/052,470, filed on May 12, 2008.

(51) Int. Cl.
*B60K 25/06* (2006.01)
*B60W 10/30* (2006.01)

(52) U.S. Cl. ........... 701/51; 180/53.8; 74/15.66; 477/79

(58) Field of Classification Search ............... 701/51; 180/53.1, 53.7, 53.8, 337; 74/11, 15.6, 15.63, 74/15.66, 15.82, 15.84, 15.86, 15.88, 339, 74/335, 473.1, 473.21; 477/34, 70, 79
See application file for complete search history.

(56) References Cited

U.S. PATENT DOCUMENTS

| | | | |
|---|---|---|---|
| 6,297,566 B1 * | 10/2001 | Lahr et al. | 307/10.1 |
| 6,634,988 B2 * | 10/2003 | Shultz et al. | 477/116 |
| 7,704,186 B2 * | 4/2010 | Mundy et al. | 477/79 |
| 2008/0119326 A1 | 5/2008 | Mundy et al. | |
| 2009/0281697 A1 | 11/2009 | Shultz et al. | |

* cited by examiner

*Primary Examiner* — Ruth Ilan
*Assistant Examiner* — Keith Frisby

(57) ABSTRACT

A system and method for selectively engaging and disengaging auxiliary equipment to avoid gear clash in a vehicle is disclosed. The system includes a transmission, a transfer case, and a transmission controller. The transmission has a plurality of gears and the transfer case is coupled to the transmission by an output shaft. The controller includes control logic for controlling the engagement and disengagement of the auxiliary equipment. The control logic has a first control logic for determining whether an operator has actuated a selector switch, a second control logic for actuating a torque transmitting device to engage or disengage the auxiliary equipment and avoid gear clash, a third logic for monitoring the engagement or disengagement of the auxiliary equipment, and a fourth control logic determining whether the auxiliary equipment has been engaged or disengaged.

19 Claims, 4 Drawing Sheets

GEAR CLASH LOGIC

CROSS-REFERENCE TO RELATED APPLICATIONS

This application is a divisional of U.S. application Ser. No. 12/332,884 filed on Dec. 11, 2008 now U.S. Pat. No. 8,135,520, which claims the benefit of U.S. Provisional Application No. 61/052,470, filed on May 12, 2008. The disclosure of the above application is incorporated herein by reference.

TECHNICAL FIELD

The present invention relates to systems and methods for preventing gear clash in vehicles having a transfer case that couples a transmission output shaft to auxiliary equipment.

BACKGROUND

Commercial vehicles such as fire truck pumpers, sewer cleaners, and oil field pumpers include an auxiliary gearbox or transfer case that is connected to the output shaft of the vehicle's transmission. In auxiliary equipment mode, the transfer case drives auxiliary equipment, and the transmission controller provides a secondary mode of operation. A secondary mode of operation could be a single forward range or all ranges with a shift schedule specific to the auxiliary equipment.

The process of transfer case engagement and disengagement with auxiliary equipment takes place with the transmission output shaft locked by applying locking clutches. The locking clutch application is referred to as Neutral Very Low (NVL) range. In NVL, auxiliary equipment engagement and disengagement is difficult to achieve when gear teeth do not line up properly such that a "gear-clash" condition exists. "Gear-clash" in the transfer case cannot be overcome with a transfer case actuator. Operators will attempt to eliminate "gear-clash" by selecting drive or reverse. A high failure rate of transfer case actuators is attributed to "gear-clash". Another "gear-clash" condition exists when the gear teeth have been lined up properly, however, the gear teeth do not slide to full engagement due to transmission drag torque on the gear teeth.

Therefore, there is a need for a system and method to preventing "gear-clash" that addresses both gear teeth alignment and gear teeth engagement. The system and method for preventing "gear-clash" should operate during engagement and disengaging of the auxiliary equipment.

SUMMARY

In an aspect of the present invention, a system is provided for selectively engaging and disengaging auxiliary equipment to avoid gear clash in a vehicle. The system includes a transmission, a transfer case, and a transmission controller. The transmission has a plurality of gears for establishing a plurality of gear ratios. The transfer case is coupled to the transmission by an output shaft. The transmission controller is in communication with a plurality of control devices for controlling the operation of the transmission. The controller includes control logic for controlling the engagement and disengagement of the auxiliary equipment. The control logic has a first control logic for determining whether an operator has actuated a selector switch, a second control logic for actuating a torque transmitting device to engage or disengage the auxiliary equipment and avoid gear clash, a third logic for monitoring the engagement or disengagement of the auxiliary equipment, and a fourth control logic determining whether the auxiliary equipment has been engaged or disengaged.

In still another aspect of the present invention, a method for selectively engaging and disengaging auxiliary equipment to avoid gear clash in a transfer case of a vehicle is provided. The method includes determining whether an operator has actuated a selector switch, actuating a torque transmitting device to engage or disengage the auxiliary equipment and avoid gear clash, monitoring the engagement or disengagement of the auxiliary equipment, and determining whether the auxiliary equipment has been engaged or disengaged.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
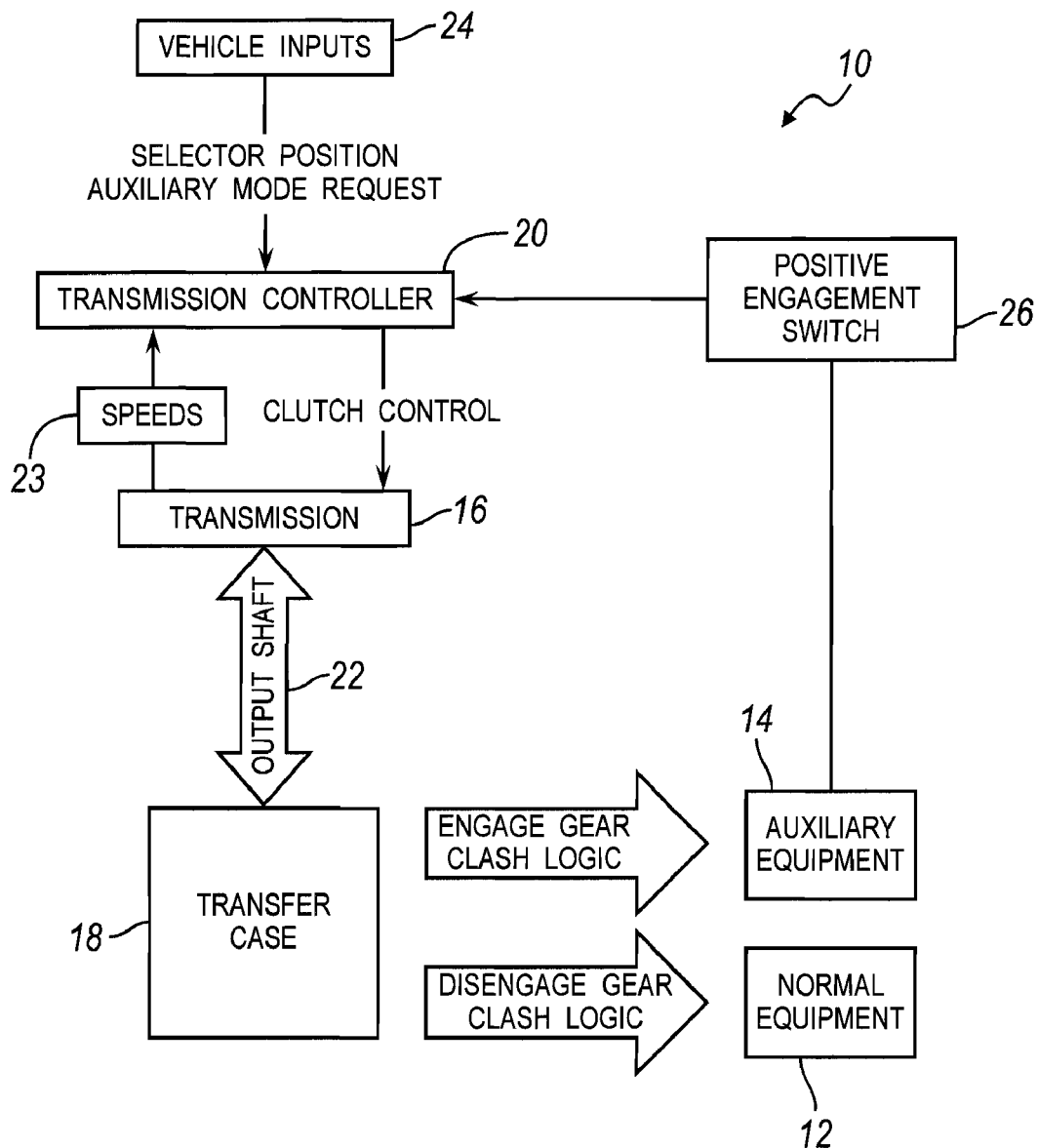
FIG. 1 is a schematic diagram of a system for selectively powering auxiliary equipment to avoid gear clash in a vehicle, in accordance with an embodiment of the present invention.

Referring to the drawings, wherein like reference numbers refer to like components, in FIG. 1 a system 10 for selectively powering a first set of equipment 12 and a second set or auxiliary set of equipment 14 to avoid gear clash is schematically illustrated. Gear clash includes misalignment of gear teeth and the present invention contemplates that the teachings described herein may be most useful in vehicles having auxiliary power equipment that require a power transfer from the transmission. For example, commercial vehicles such as fire trucks, sewer cleaners and oil field pumpers all have auxiliary equipment that require a power transfer from the transmission to operate. Of course, one of ordinary skill in the art will appreciate that the teachings of the present invention can be applied not only to these types of vehicles but to other vehicles and systems as well.

In an embodiment of the present invention, system 10 includes a transmission 16, a transfer case 18, a transmission controller 20 and control logic embodied in hardware, software, or a combination of hardware and software within controller 20. The transmission 16 is a conventional vehicle transmission and, generally, has a plurality of gears for establishing a plurality of gear ratios. For example, transmission 16 is the transmission shown and described in U.S. Pat. No. 4,070,927, hereby incorporated by reference. Transmission 16 may have six forward gear speeds or gear ratios and two reverse gear speeds or gear ratios. Of course, the present invention contemplates is operable with transmissions having other gear speeds. Transmission 16 typically has a plurality torque transmitting devices (not shown) for selectively transferring power between the plurality of gears and ultimately to a transmission output shaft 22. Moreover, at least one of torque transmitting devices (C4) is configured to selectively prevent rotation of the transmission output shaft 22. In order to transmit torque from an engine to the output shaft 22, at least two torque transmitting devices must be engaged and the torque transmitting device C4 must be disengaged. When the transmission 16 is in neutral, only one torque transmitting mechanism (C5) is engaged or activated. The torque transmitting devices are clutches or brakes as is well known in the field of transmissions.

The transfer case 18 includes a plurality of gears to transfer torque or power from the transmission to auxiliary equipment 14. The transmission output shaft 22 couples the transfer case 18 to transmission 16. The transmission controller 20, generally, includes a processor (not shown) in communication with electronic memory storage devices (not shown). Further, control logic is also provided in controller 20 and may be implemented in hardware, software, or a combination of hardware and software. For example, a control logic may be in the form of program code that is stored on the electronic memory storage and executable by the processor. Generally, controller 20 receives transmission speed signals from transmission speed sensors 23 mounted to transmission 16. Additionally, transmission controller 20 receives other inputs from other vehicle input devices 24 such as an auxiliary mode selection switch. The auxiliary mode selection switch provides an output to controller 20 indicative of an operator requesting auxiliary power mode or the engagement of the auxiliary equipment 14. Further, a positive engagement switch or sensor 26 is in communication with the auxiliary equipment 14 and the transmission controller 20. The positive engagement switch 26 provides an output to controller 20 indicative of engagement or disengagement of the auxiliary equipment 14. The controller 20 receives these inputs and selectively activates a plurality of control devices such as the torque transmitting devices to control the operation of the transmission and the rotation of the transmission output shaft 22.

For example, a control logic implemented in software program code that is executable by the processor of controller 20 includes a first control logic for determining whether an operator has actuated a selector switch, a second control logic for determining whether a transmission output speed is greater than an output speed threshold, a third control logic for engaging a torque transmitting device to lock the transmission output shaft, a fourth control logic for incrementing a first timer after the transmission output shaft is locked, a fifth control logic for comparing a first recorded time recorded by the first timer to a first time threshold, a sixth control logic for disengaging all torque transmitting devices so that no torque is transferred to the output shaft, a seventh control logic for incrementing a second timer, an eighth control logic for comparing a second recorded time recorded by the second timer to a second time threshold, a ninth control logic for engaging the torque transmitting device engaged during neutral and disengaging the torque transmitting device that locks the output shaft to allow the transmission output shaft to rotate, a tenth control logic for incrementing a third timer after the torque transmitting device has been disengaged to allow the transmission output shaft to rotate and an eleventh control logic for comparing a third recorded time recorded by the third timer to a third time threshold.

Figure 2:
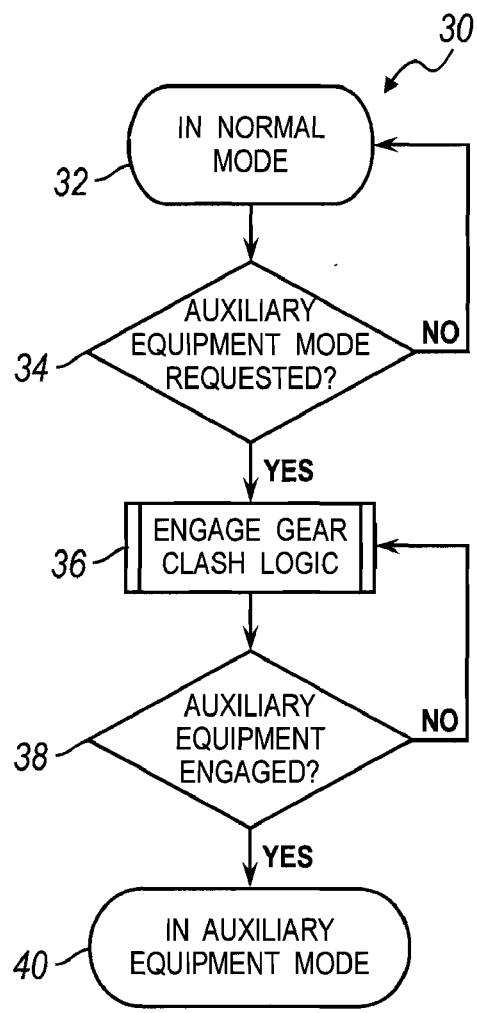
FIG. 2 is a flowchart of a method for controlling the engagement of auxiliary equipment, in accordance with an embodiment of the present invention.

Referring now to FIG. 2, a flowchart of a method 30 for controlling the engagement of the second set or auxiliary set of equipment is illustrated, in accordance with an embodiment of the present invention. The method 30 is initiated at block 32 with the vehicle having the auxiliary equipment originally being in a normal mode of operation with the auxiliary equipment disengaged. At block 34, the method 30 determines whether an auxiliary equipment mode has been selected by a vehicle operator indicative of a desire to engage the auxiliary equipment. If the method 30 has determined that an auxiliary equipment mode has been requested, then the method 30 enters an engage gear clash logic routine, as represented by block 36, to prevent gear clash in the transfer case and engage the auxiliary equipment, as will be described in further detail hereinafter. Once the engage gear clash logic routine 36 has terminated the method 30 proceeds to block 38. However, if the method 30 of the present invention determines that auxiliary equipment mode has not been requested then the method 30 returns to block 32. At block 38, the method 30 determines whether the auxiliary equipment is engaged by monitoring an auxiliary equipment engagement sensor. If the method 30 determines that the auxiliary equipment is engaged at block 38, then the method 30 terminates in auxiliary equipment mode, as represented by block 40. However, if the method 30 of the present invention determines that the auxiliary equipment has not been engaged then the method 30 returns to block 36 and re-enters the engage gear clash logic routine.

Figure 3:
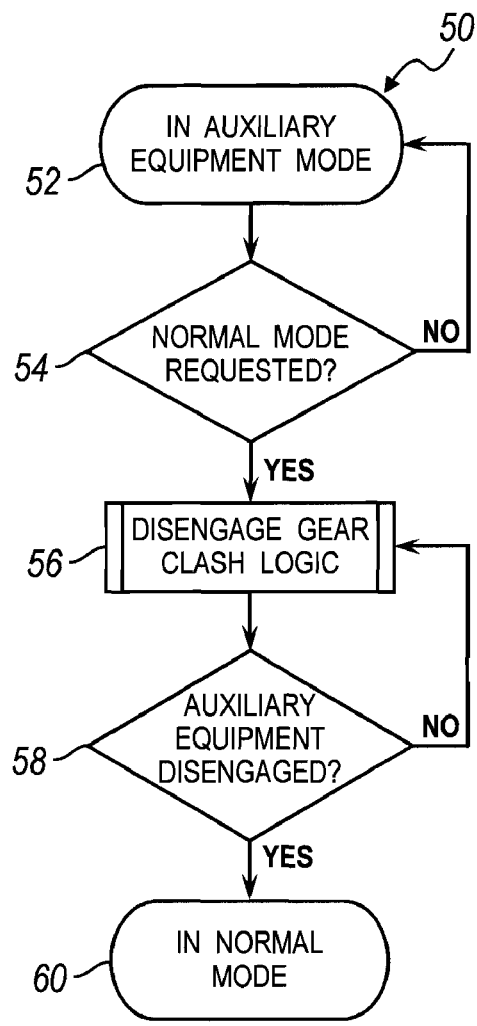
FIG. 3 is a flowchart of a method for controlling the disengagement of the auxiliary equipment, in accordance with an embodiment of the present invention.

Referring now to FIG. 3, a flowchart of a method 50 for controlling the disengagement of the second set or auxiliary set of equipment is illustrated, in accordance with an embodiment of the present invention. Method 50 is initiated at block 52 with the vehicle having the auxiliary equipment being in an auxiliary equipment mode of operation with the auxiliary equipment engaged. At block 54, the method 50 determines whether normal operation mode has been selected by a vehicle operator indicative of a desire to disengage the auxiliary equipment. If the method 50 has determined that a normal operation mode has been requested, then the method 50 enters a disengage gear clash logic routine, as represented by block 56, to prevent gear clash in the transfer case and disengage the auxiliary equipment, as will be described in further detail hereinafter. Once the disengage gear clash logic routine 56 has terminated the method 50 proceeds to block 58. However, if the method 50 of the present invention determines that normal operation mode has not been requested then the method 50 returns to block 52. At block 58, the method 50 determines whether the auxiliary equipment is disengaged by monitoring an auxiliary equipment engagement sensor. If the method 50 determines that the auxiliary equipment is disengaged at block 58, then the method 50 terminates in normal operation mode, as represented by block 60. However, if the method 50 of the present invention determines that the auxiliary equipment has not been disengaged then the method 50 returns to block 56 and re-enters the disengage gear clash logic routine.

Figure 4:
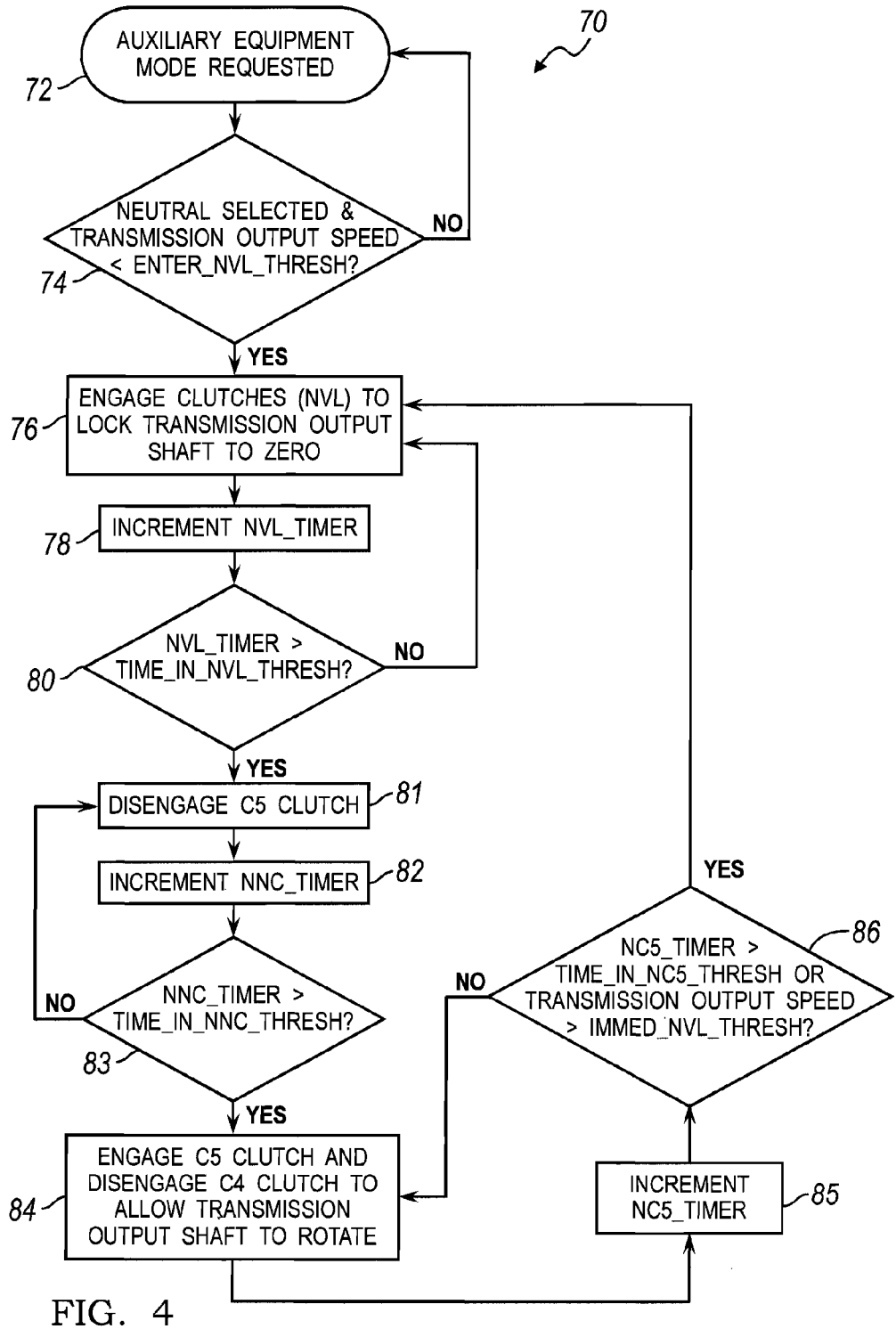
FIG. 4 is a flowchart of method for engaging the auxiliary equipment and preventing "gear clash", in accordance with an embodiment of the present invention.

Referring now to FIG. 4, a flowchart of a method 70 for preventing "gear clash" during engagement of the auxiliary set of equipment 14 by the transfer case 18 is illustrated in accordance with an embodiment of the present invention. The method 70 operates by controlling the torque transferred to the output shaft 22 of the transmission 16 in order to control the amount of torque transferred to the transfer case 18 as the transfer case 18 engages the auxiliary equipment 14. By controlling the torque through the output shaft 22, the torque through gear teeth within the transfer case 18 is controlled to prevent gear clash. For example, the method 70 is initiated at block 72 with the vehicle operator requesting engagement of the auxiliary equipment. At block 74, the method determines whether the transmission has been placed in neutral and compares the transmission output speed with a predefined speed threshold (Enter_NVL_Thresh). When the transmission has been placed in neutral, one torque transmitting device (C5) is applied and all other torque transmitting devices are disengaged. If the method 70 has determined that the transmission has been placed in neutral and that the transmission output speed is less than the predefined speed threshold, then a torque transmitting device (C4) is engaged to lock the transmission output shaft 22 and prevent further rotation in order to initiate a Neutral Very Low (NVL) condition, as represented by block 76. However, if method 70 of the present invention determines that the transmission has not been placed in neutral or that the transmission output speed is greater than the predefined speed threshold (Enter_NVL_Thresh), then the method returns to block 72. At block 78, a first timer (NVL_Timer) is incremented and recorded. The time recorded by the NVL_Timer is compared to a predefined time threshold (Time_in NVL_Thresh), as represented by block 80. If the method 70 of the present invention determines that the time recorded by NVL_Timer is not greater than Time_in NVL_Thresh, then the method 70 returns to block 76 and re-enters the gear clash logic routine. If at block 80 the method 70 determines that the time recorded by NVL_Timer is greater than Time_in NVL_Thresh, then the transmission is placed in a neutral no clutches (NNC) condition where the torque transmitting device (C5) operable to place the transmission in neutral is disengaged, as indicated by block 81. In the NNC condition, no transmission drag torque is carried over to the output shaft 22 since all the torque transmitting devices that transmit torque to the output shaft 22 are disengaged. However, the torque transmitting device C4 operable to lock the output shaft 22 remains engaged. At block 82, a second timer (NNC_Timer) is incremented and recorded. The time recorded by the NNC_Timer is compared to a predefined time threshold (Time_in_NNC_Thresh), as represented by block 83. If the method 70 of the present invention determines that the time recorded by NNC_Timer is not greater than Time_in_NNC_Thresh, then the method 70 returns to block 81 and re-enters the disengage gear clash logic routine. If at block 83 the method 70 determines that the time recorded by NNC_Timer is greater than Time_in_NNC_Thresh, then the method 70 proceeds to block 84. At block 84, the torque transmitting device (Clutch C5) that engages neutral is engaged and the torque transmitting device (Clutch C4) is disengaged to allow the transmission shaft 22 to rotate. At block 85, a third timer NC5_Timer is incremented and the time is recorded. The time recorded by the NC5_Timer is compared to a predefined time threshold (Time_in_NC5_Thresh) and the transmission output speed is compared to a speed threshold (Immed_NVL_Thresh), as represented by block 86. If at block 86 the method determines that the time recorded by NC5_Timer is greater than Time_in_NC5_Thresh or if the transmission output speed is greater than Immed_NVL_Thresh, then the method returns to block 76 or the method ends. However, if method 70 of the present invention determines that the time recorded by NC5_Timer is not greater than Time_in_NC5_Thresh or if the transmission output speed is not greater than Immed_NVL_Thresh, then the method returns to block 84.

Figure 5:
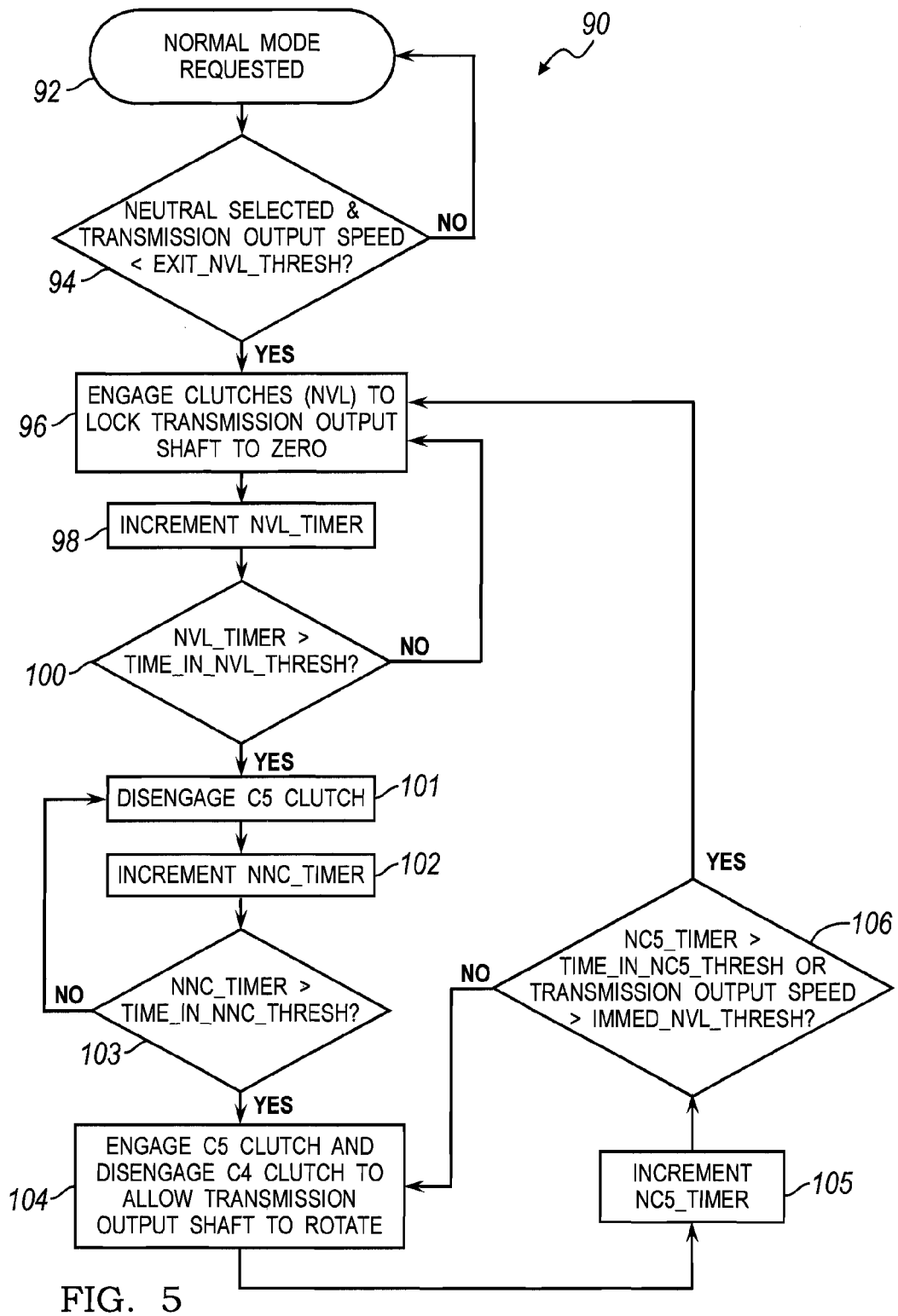
FIG. 5 is a flowchart of a method for disengaging the auxiliary equipment and preventing "gear clash", in accordance with an embodiment of the present invention.

Referring now to FIG. 5, a flowchart of a method 90 for preventing "gear clash" during disengagement of the auxiliary set of equipment 14 by the transfer case 18 is illustrated in accordance with an embodiment of the present invention. The method 90 operates by controlling the output shaft 22 of the transmission 16 in order to control the amount of torque transferred to the transfer case 18 as the transfer case 18 disengages the auxiliary equipment 14. By controlling the torque through the output shaft 22, the torque through gear teeth within the transfer case 18 is controlled to prevent gear clash. For example, the method 90 is initiated at block 92 with the vehicle operator requesting normal operation mode or disengagement of the auxiliary equipment. At block 94, the method determines whether the transmission has been placed in neutral and compares the transmission output speed with a predefined speed threshold (Exit_NVL_Thresh). If method 90 has determined that transmission has been placed in neutral and that the transmission output speed is less than Exit_NVL_Thresh then, then a torque transmitting device (C4) is engaged to lock the transmission output shaft 22 and prevent further rotation in order to initiate a Neutral Very Low (NVL) condition, as represented by block 96. However, if the method 90 of the present invention determines that the transmission has not been placed in neutral or that the transmission output speed is greater than the predefined speed threshold (Exit_NVL_Thresh), then the method returns to block 92. At block 98, a first timer (NVL_Timer) is incremented and recorded. The time recorded by the NVL_Timer is compared to a predefined time threshold (Time_in NVL_Thresh), as represented by block 100. If the method 90 of the present invention determines that the time recorded by NVL_Timer is not greater than Time_in_NVL_Thresh, then the method 90 returns to block 96 and re-enters the disengage gear clash logic routine. If at block 100 the method 90 determines that the time recorded by NVL_Timer is greater than Time_in_NVL_Thresh, then the transmission is placed in a neutral no clutches (NNC) condition where the torque transmitting device (C5) operable to place the transmission in neutral is disengaged, as indicated by block 101. In the NNC condition, no transmission drag torque is carried over to the output shaft 22 since all the torque transmitting devices that transmit torque to the output shaft 22 are disengaged. However, the torque transmitting device C4 operable to lock the output shaft 22 remains engaged. At block 102, a second timer (NNC_Timer) is incremented and recorded. The time recorded by the NNC_Timer is compared to a predefined time threshold (Time_in_NNC_Thresh), as represented by block 103. If the method 90 of the present invention determines that the time recorded by NNC_Timer is not greater than Time_in_NNC_Thresh, then the method 90 returns to block 101 and re-enters the disengage gear clash logic routine. If at block 103 the method 90 determines that the time recorded by NNC Timer is greater than Time in NNC Thresh, then the method 90 proceeds to block 104. At block 104, the torque transmitting device (Clutch C5) that engages neutral is engaged and the torque transmitting device (Clutch C4) is disengaged to allow the transmission shaft 22 to rotate. At block 105, a third timer NC5_Timer is incremented and the time is recorded. The time recorded by the NC5_Timer is compared to a predefined time threshold (Time_in_NC5_Thresh) and the transmission output speed is compared to a speed threshold (Immed_NVL_Thresh), as represented by block 106. If at block 106 the method 90 determines that the time recorded by NC5_Timer is greater than Time_in_NC5_Thresh or if the transmission output speed is greater than Immed_NVL_Thresh, then the method returns to block 96 or the method ends. However, if method 90 of the present invention determines that the time recorded by NC5_Timer is not greater than Time_in_NC5_Thresh or if the transmission output speed is not greater than Immed_NVL_Thresh, then the method returns to block 104.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of

We claim the following:

1. A method for selectively controlling a transmission to avoid gear clash in a transfer case of a vehicle, the method comprising the steps of:
   determining whether a change of mode request has been selected by an operator of the vehicle;
   disengaging a first torque transmitting device and engaging a second torque transmitting device in order to establish a neutral gear ratio;
   engaging the first torque transmitting device and the second torque transmitting device to lock an output shaft of the transmission;
   disengaging the second torque transmitting device; and
   engaging the second torque transmitting device and disengaging the first torque transmitting device to allow the output shaft to rotate.

2. The method of claim 1 wherein the step of engaging a first torque transmitting device and a second torque transmitting device begins when a change of mode request has been received by the transmission controller, when the transmission is in neutral, and when a transmission output speed is less than a transmission output speed threshold.

3. The method of claim 2 further comprising the step of incrementing a first timer after the transmission output shaft is locked.

4. The method of claim 3 further comprising the step of comparing a first recorded time recorded by the first timer to a first time threshold.

5. The method of claim 4 wherein the step of disengaging the second torque transmitting device begins when the first recorded time exceeds the first time threshold.

6. The method of claim 3 further comprising the step of incrementing a second timer after the second torque transmitting device has been disengaged to allow the transmission output shaft to rotate.

7. The method of claim 6 further comprising the step of comparing a second recorded time recorded by the second timer to a second time threshold.

8. The method of claim 7 wherein the step of engaging the second torque transmitting device and disengaging the first torque transmitting device begins when the second recorded time exceeds the second time threshold.

9. The method of claim 3 further comprising the step of incrementing a third timer after the second torque transmitting device has been engaged and the first torque transmitting device has been disengaged.

10. The method of claim 9 further comprising the step of comparing a third recorded time recorded by the third timer to a third time threshold.

11. The method of claim 10 wherein the method terminates when the third recorded time exceeds the third time threshold or the transmission output speed exceeds a second transmission output speed threshold.

12. A method for selectively controlling a transmission to avoid gear clash in a transfer case of a vehicle, the method comprising the steps of:
   determining whether a change of mode request has been selected by an operator of the vehicle;
   engaging a first torque transmitting device and a second torque transmitting device to lock an output shaft of the transmission;
   incrementing a first timer after the transmission output shaft is locked;
   comparing a first recorded time recorded by the first timer to a first time threshold;
   disengaging the second torque transmitting device when the first recorded time exceeds the first time threshold; and
   engaging the second torque transmitting device and disengaging the first torque transmitting device to allow the output shaft to rotate, and
   wherein the second torque transmitting device is engaged and the first torque transmitting device is disengaged in order to establish a neutral gear ratio.

13. The method of claim 12 wherein the step of engaging a first torque transmitting device and a second torque transmitting device begins when a change of mode request has been received by the transmission controller, when the transmission is in neutral, and when a transmission output speed is less than a transmission output speed threshold.

14. The method of claim 12 further comprising the step of incrementing a second timer after the second torque transmitting device has been disengaged to allow the transmission output shaft to rotate.

15. The method of claim 14 further comprising the step of comparing a second recorded time recorded by the second timer to a second time threshold.

16. The method of claim 15 wherein the step of engaging the second torque transmitting device and disengaging the first torque transmitting device begins when the second recorded time exceeds the second time threshold.

17. The method of claim 12 further comprising the step of incrementing a third timer after the second torque transmitting device has been engaged and the first torque transmitting device has been disengaged.

18. The method of claim 17 further comprising the step of comparing a third recorded time recorded by the third timer to a third time threshold.

19. The method of claim 18 wherein the method terminates when the third recorded time exceeds the third time threshold or the transmission output speed exceeds a second transmission output speed threshold.

* * * * *